No. 692,778. Patented Feb. 4, 1902.
W. BORROWE & J. LUMLEY.
MACHINE FOR MOLDING PLASTIC MATERIALS.
(Application filed June 1, 1900. Renewed July 24, 1901.)
(No Model.)
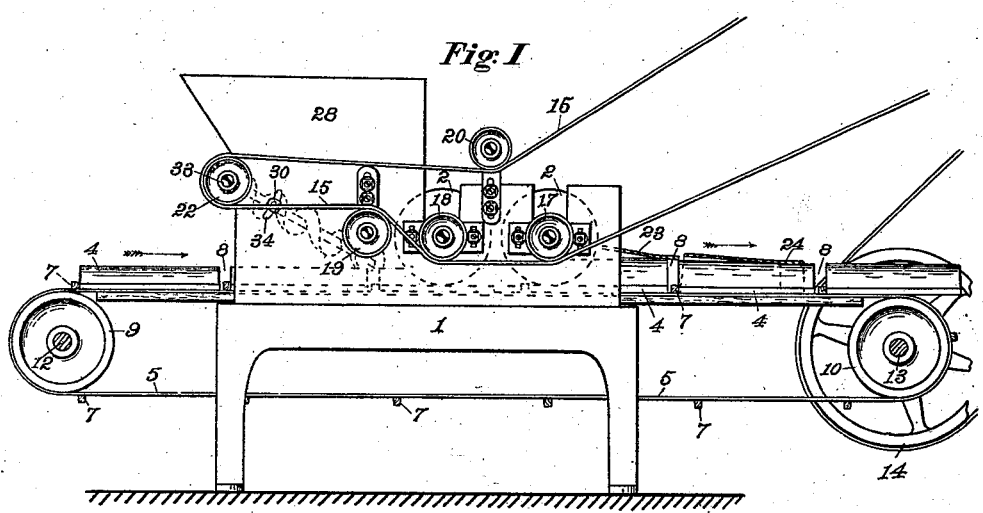
Fig. I
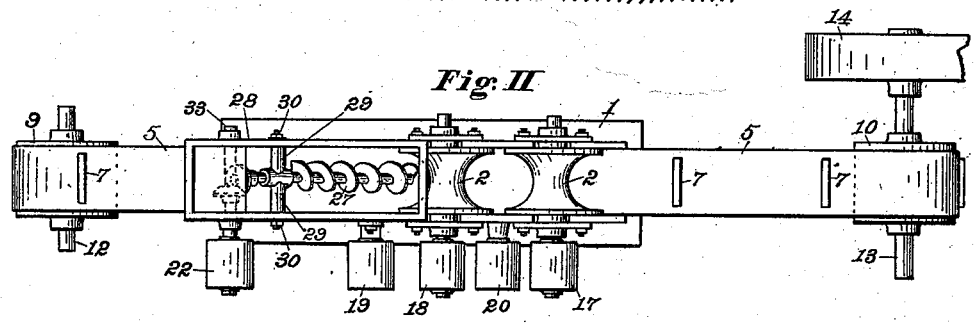
Fig. II
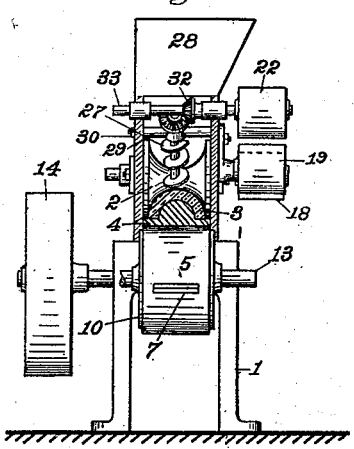
Fig. III
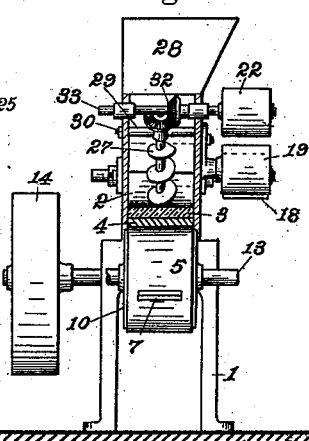
Fig. V
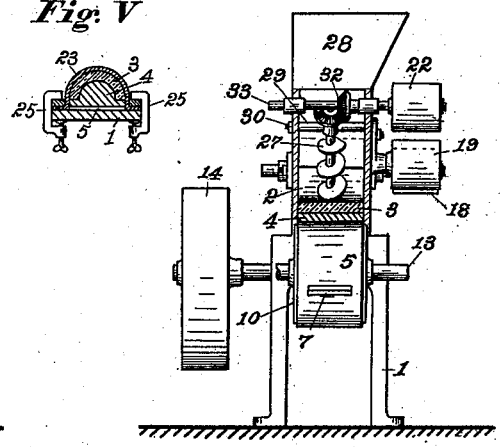
Fig. IV
Witnesses:
P. W. J. Lander,
Elmer Wickes.
Inventors:
William Borrowe
John Lumley,
By J. Richards & Co.
Attys.

UNITED STATES PATENT OFFICE.

WILLIAM BORROWE AND JOHN LUMLEY, OF SAN FRANCISCO, CALIFORNIA; SAID BORROWE ASSIGNOR TO MARY ELIZABETH BORROWE, OF SAUSALITO, CALIFORNIA.

MACHINE FOR MOLDING PLASTIC MATERIALS.

SPECIFICATION forming part of Letters Patent No. 692,778, dated February 4, 1902.

Application filed June 1, 1900. Renewed July 24, 1901. Serial No. 69,581. (No model.)

*To all whom it may concern:*

Be it known that we, WILLIAM BORROWE and JOHN LUMLEY, citizens of the United States of America, residing at San Francisco, county of San Francisco, and State of California, have invented certain new and useful Improvements in Machines for Molding Plastic Materials; and we hereby declare the following to be a full, clear, and exact description of the same, reference being had to the accompanying drawings, forming a part of this specification.

Our invention relates to a machine for molding and shaping cylinders, slabs, and other forms of heat-insulating material when such material is in a plastic state, and is an improvement on machinery and apparatus set forth in Letters Patent No. 629,102, relating to machinery for preparing pipe-covering, granted to us on the 18th day of July, 1899.

Our present improvement consists in combining with means for molding, shaping, and smoothing the plastic articles means for automatically feeding the prepared plastic insulating material to the molding mechanism in such graduated and regulable quantity and in such manner as that the said material shall not suffer injurious compression whereby its heat-insulating properties may be impaired in the treatment.

The objects of our invention are to obtain a regular and complete performance of the machinery, a more perfect product, and increased celerity of the work in shaping or molding both flat and circular forms.

Referring to the drawings, Figure I is a side elevation of a machine for molding either flat or curved forms of plastic material constructed according to our invention. Fig. II is a plan view of the same machine. Fig. III is an end view, partly in section, when the machine is arranged for forms of a curved section. Fig. IV is an end view, partly in section, when the machine is arranged to produce forms of a flat or rectangular section. Fig. V is a sectional view of one of the smoothing-dies to finish and smooth the surfaces of the sections.

In the preparation of material for heat insulation the processes, whatever their nature, should be such as to not compact the plastic material in such manner or degree as to destroy its porosity, because the efficiency or insulating value of such material depends in great degree on its cellular structure and the fixed air contained therein. This requirement prohibits the extrusion and other processes, such as are suitable for molding plastic material into earthen pipes and the like, where pressure and compacting are desirable and necessary. On the contrary, the purpose of our improvement is to mold or form the material by a treatment as gentle as possible and without pressure that will close the pores or interstices throughout the mass.

The material to be treated consists, usually, of some earthy substance—such as magnesia, asbestos, silicate of alumina, or diatomaceous earth, constituting an infusorial base—usually mixed with some fibrous material, preferably of cellular structure, to form a mechanical bond, the compound being mixed with water or other liquid to a plastic condition, after which the material is molded into various sections, such as are required in use to cover walls, pipes, or vessels for the purpose of either repelling or retaining heat, as may be required.

To these ends we construct machinery substantially as shown in the drawings, consisting of a main supporting-frame 1, provided with shaping-rollers 2, having a contour to fit the desired form of the sections 3 of insulating material, curved, as in Fig. III, to form a half tube or cylinder, such as is employed in covering pipes, or in flat section, as in Fig. IV, to cover plain surfaces, also any other form of uniform section that may be required. These sections 3 are molded or shaped on bottom boards or forms 4 to give the required shape on one side, corresponding to that of the rollers 2, and to support the material while it is soft and in a plastic condition and while being dried, after which it becomes rigid and is removed from the forms 4 for trimming and subsequent treatment, such as covering with cloth. The forms 4 are moved positively through the machine by means of a conveyer or endless band 5, provided with spaced stops 7, against which the forms 4 abut, as shown in Fig. I, forming a nearly-continuous line or row, with short spaces 8 between. The conveyer-band 5 passes around drums 9 and 10, one at each end, suitably supported on the shafts 12 and 13, the latter being driven, preferably, by a band on the pulley 14, connecting with a line-shaft or the driving power. The rollers 2 are driven by means of a continuous band or belt 15, passing around the pulleys 17 and 18, over and under idle pulleys 19 and 20, and around the pulley 22 at the end, as shown in Fig. I, the latter-named pulley driving the devices to supply the material, as hereinafter explained. The size of the pulleys 17 and 18 and the speed of the band 15 are so arranged that the peripheries of the shaping-rollers 2 move faster relatively than the conveyer-band 5, thus producing a rubbing action that smooths the surface of the material and prevents it from adhering to the rollers when of a viscous nature. It may seem that the limited area of contact on the pulleys 17 and 18 is not enough to impel the rollers 2; but it must be remembered that the material throughout has to be treated in a gentle manner in so far as pressure to avoid compactment of the particles and closure of the cells or interstices on which the efficiency of the finished material depends. After passing beneath the forming-rollers 2, which, as before explained, can be of any desired figure or contour, the sections or pieces 3 pass through the smoothing-dies 23 24. (Shown in Fig. I.) These dies are made of smooth noncorrosive metal and are attached to the main frame 1 by the clamps 25. These dies 23 24 are slightly tapered, as shown, and diminish in size in the direction of movement, as indicated by arrows in Fig. I. In this manner of operating it will be obvious that the plastic material has to be supplied in definite quantity or in proportion to the movement of the conveyer-band 5, and this constitutes a chief difficulty in the operation, because the devices for regulation must not condense, but rarefy the material and permit as far as possible the incorporation of air in the mass at the point of its entering beneath the rollers 2. For this purpose we employ a revolving helical conveyer 27, placed in the bottom of the supply-hopper 28 and adjustable in respect to its axis of revolution to various angles, so that it advances a variable amount of material to and beneath the rollers 2, dependent on adjustment. The helix or screw 27 is supported in a bearing member 29, adjustably clamped to the sides of the main frame 1 by the screws 30 and is driven by bevel-wheels 32 from the shaft 33, as shown in Figs. III and IV. Curved slots 34, formed in the sides of the main frame, permit adjustment of the screw 27 concentrically about the axis of the shaft 33, so the gear-wheels 32 will be held in true engagement. By raising or lowering the outer end of the screw 27 so the material advanced will impinge upon or pass beneath the first roller 2 the pressure there, the amount of compression, and the quantity of the material passing can be successfully adjusted. The screw 27 besides this function mixes and incorporates the plastic substance before it is molded. The material previous to passing to the hopper 28 is saturated and passes through any suitable mixing apparatus, such as is employed for like purposes.

It will be understood that the number of shaping-rollers and the number of the smoothing-dies 23 24 can be more or less as the nature of the material may require. Pairs of each are found to be sufficient in molding material consisting of diatomaceous earth and the usual fibrous component.

Having thus described the nature and objects of our invention and practical means of its application, what we claim as new, and desire to secure by Letters Patent, is—

1. In a molding-machine for porous plastics, a series of forms for supporting the plastic material, means for advancing said forms in succession, a hopper above said line of forms, molding and smoothing rollers above said forms for shaping and finishing the upper surface of the plastic material, and regulable means in connection with said hopper for feeding the plastic material to the forms and rollers in graduated quantity without compression, substantially as specified.

2. In a molding-machine for porous plastics, a series of forms for supporting the plastic material, a conveyer for carrying forward said forms in a straight line, molding and smoothing rollers above said conveyer, with means for driving the same at a surface speed slightly in excess of that of the conveyer, and in combination therewith means for feeding the plastic material to said forms in graduated and regulable quantity without compression, substantially as specified.

3. In a molding-machine for porous plastics, a series of forms for supporting the plastic material, a conveyer for carrying forward said forms in a straight line, rollers above said conveyer for giving shape and smoothness to the said material passing beneath them, means for driving said rollers at a surface speed slightly greater than that of the forms, means for feeding the plastic material to the forms in graduated and regulable quantity without compression, and smoothing-dies to complete the shape and finish of the plastic articles carried beneath them, substantially as specified.

4. In a molding-machine for plastic material, a continuously-moving conveyer-band 5, a series of bottom forms 4 thereon and advanced thereby, superimposed rollers to mold and shape the material on the forms, these latter driven by a band 15 at a rate in excess of the movement of the material to produce a rubbing action thereon, substantially as specified.

In testimony whereof we have signed our names to this specification in the presence of two subscribing witnesses.

WILLIAM BORROWE.
JOHN LUMLEY.

Witnesses:
ALFRED A. ENQUIST,
ELMER WICKES.